United States Patent
Chollet et al.

(10) Patent No.: US 12,433,835 B2
(45) Date of Patent: Oct. 7, 2025

(54) COSMETIC COMPOSITION AND TREATMENT FOR TREATING SKIN SAGGING

(71) Applicant: Sederma, Le Perray-en-Yvelines (FR)

(72) Inventors: Dominique Chollet, Chanac (FR); Caroline Ringenbach, Rambouillet (FR); Maeva Godet, Elancourt (FR); Emmanuel Doridot, Montigny le Bretonneux (FR); Philippe Mondon, Montrouge (FR)

(73) Assignee: SEDERMA, Le Perray-en-Yvelines (FR)

( * ) Notice: Subject to any disclaimer, the term of this patent is extended or adjusted under 35 U.S.C. 154(b) by 422 days.

(21) Appl. No.: 17/911,840

(22) PCT Filed: Mar. 18, 2021

(86) PCT No.: PCT/EP2021/056917
§ 371 (c)(1),
(2) Date: Sep. 15, 2022

(87) PCT Pub. No.: WO2021/185953
PCT Pub. Date: Sep. 23, 2021

(65) Prior Publication Data
US 2023/0146941 A1    May 11, 2023

(30) Foreign Application Priority Data

Mar. 20, 2020 (FR) ........................... 2002766

(51) Int. Cl.
| | | |
|---|---|---|
| *A61K 36/00* | (2006.01) | |
| *A61K 8/64* | (2006.01) | |
| *A61K 8/9789* | (2017.01) | |
| *A61Q 19/08* | (2006.01) | |

(52) U.S. Cl.
CPC .............. *A61K 8/9789* (2017.08); *A61K 8/64* (2013.01); *A61Q 19/08* (2013.01)

(58) Field of Classification Search
CPC .................................................... A61Q 19/08
See application file for complete search history.

(56) References Cited

U.S. PATENT DOCUMENTS

2021/0052480 A1    2/2021    Mondon et al.

FOREIGN PATENT DOCUMENTS

| CN | 106999401 A | | 8/2017 | |
|---|---|---|---|---|
| CN | 107951923 A | * | 4/2018 | ............ A61K 36/52 |
| CN | 108434067 A | * | 8/2018 | |
| FR | 3077202 A1 | | 8/2019 | |
| JP | 2000109420 A | * | 4/2000 | |
| JP | 2005289913 A | * | 10/2005 | |
| JP | 2012-041276 A | | 3/2012 | |
| WO | 2012164488 A2 | | 12/2012 | |
| WO | 2014080376 A2 | | 5/2014 | |
| WO | 2015181688 A1 | | 12/2015 | |
| WO | 2016097965 A1 | | 6/2016 | |
| WO | 2017216177 A1 | | 12/2017 | |

OTHER PUBLICATIONS

Choi et al., Dermal Stability and In Vitro Skin Permeation of Collagen Pentapeptides (KTTKS and palmitoyl-KTTKS) Biomolecules & therapeutics, (Jul. 2014) vol. 22, No. 4, pp. 321-327 (Year: 2014).*
International Search Report and Written Opinion for International Application No. PCT/EP2021/056917, dated Aug. 3, 2021, 11 pages.

* cited by examiner

*Primary Examiner* — Qiuwen Mi
(74) *Attorney, Agent, or Firm* — Buchanan Ingersoll & Rooney PC

(57) ABSTRACT

The composition comprises a plant extract of the *Engelhardtia* genus, preferably the species is *Engelhardtia chrysolepsis* Hance. The treatment according to the invention is a repairing treatment to improve the number of elastic fibres and the quality of its network. Skin elasticity is improved and this helps decrease jowls and eyelids drooping, and the corresponding skin folds. The treatment is particularly adapted to a pre-menopausal or menopausal woman skin.

3 Claims, 1 Drawing Sheet

Specification includes a Sequence Listing.

COSMETIC COMPOSITION AND TREATMENT FOR TREATING SKIN SAGGING

CROSS REFERENCE TO RELATED APPLICATIONS

This application is the U.S. National Phase application of International Application PCT/EP2021/056917, filed on Mar. 18, 2021, which claims priority to French Patent Application No. 2002766, filed on Mar. 20, 2020, the contents of each of which are incorporated by reference in their entireties for all purposes.

TECHNICAL FIELD

The present invention relates to a cosmetic composition and treatment for treating skin sagging. It aims especially the cosmetic, dermatological, and hygiene and personal care products industries.

BACKGROUND ART

Chronological or innate ageing is variable from one individual to another because it is very strongly linked to his genetic heritage which, for example, conditions the production of protective pigments, manages the antioxidant and immune defences or even determines the time of menopause. Another type of ageing overlaps the first one. It is induced by frequent sun exposure, by environmental pollutants, by our diet too rich in sugars and/or fats and our way of life (stress, little rest time, significant and/or too rapid weight loss, pregnancy, breastfeeding, etc.). It is also highly variable from one individual to another.

During skin aging, the face and the body change and lose their harmony. The skin thins and gradually becomes distended (skin sagging or flaccidity). The skin is less elastic, less firm and less smooth (crepiness effect). The skin returns to its shape less easily when stretched because it has lost its resilience. The skin will sag under its own weight (ptosis). On the face, this results in the oval or contour of the face that is less defined, with the apparition of jowls on the lower jaw and/or apparition of drooping eyelids, and the formation of unsightly folds such as for example on the eyelids (see FIG. 1) or on each side of the mouth (also called perioral "marionette line" see FIG. 2). Other parts of the body are also affected, such as the neck under the chin, the underarms, the underbelly or between breasts.

At the level of the skin constituents, elasticity is modified during aging because of the decrease of the produced elastin quantity and also because of the destruction of the elastic fibre network.

In the extracellular matrix, elastics fibres are composed of elastin and microtubules. They appear in young people in the form of a dense and strongly linked network. They thus provide resilience and elasticity to the skin. Elastin, which is the predominant component (90%) of the elastic fibre, is produced in an immature form called tropoelastin. Tropoelastin self-assembles on a pre-established scaffolding of microfibres composed of fibrillin, which is assembled and maintained thanks to the protein MFAP4 (MicroFibrillar-Associated Protein 4). This protein decreases in aged skins and therefore is crucial. Another protein, the fibulin-5, also participates in the construction of this scaffolding.

The dermo-epidermal junction (DEJ) is a key part of the skin as it assures the epidermis structure and the cohesion between the dermis and the epidermis. During aging, a decrease of synthesis of its components (especially collagen IV, VII and laminin V) and a flattening of the DEJ, very clear in menopausal skin, are observed. This weakening takes place through a deleterious action of proteases on hemidesmosomes linking keratinocytes of the epidermis to proteins of the DEJ (collagen IV, VII and laminin V). The aging of the DEJ will therefore also have significant repercussions on the resilience of the skin and the loss of its dynamism.

SUMMARY OF THE INVENTION

The object of the present invention is to provide a solution to skin sagging linked to qualitative and/or quantitative deficit of elastin and elastic fibres.

For this purpose, it provides the use of a plant extract of *Engelhardtia* genus for a non-therapeutic cosmetic treatment of skin sagging. In particular, the facial features or lines are re-harmonized thanks to the treatment according to the invention.

The *Engelhardtia* genus includes in particular the following species: *Engelhardtia chrysolepsis* Hance (synonym: *Engelhardtia roxburghiana* Lindl), *Engelhardtia apoensis* Elmer ex Nagel, *Engelhardtia hainanensis* P. Y. Chen, *Engelhardtia mendalomensis* E. J. F. Campb., *Engelhardtia mersingensis* E. J. F. Campb., *Engelhardtia rigida* Blume, *Engelhardtia mollis* Hu, *Engelhardtia serrata* Blume, *Engelhardtia spicata* Lechen ex Blume, *Engelhardtia spicata* var. integra (Kurz) W. E. Manning ex Steenis and *Engelhardtia unijuga* (Chun) Chun ex P. Y. Chen.

Preferably, the present invention aims the use of an extract of the *Engelhardtia chrysolepis* Hance species.

*Engelhardtia chrysolepis* Hance is a subtropical plant known for several centuries and probably millennia in Asia. Its leaves are freely on sale and used as herbal tea, with a slightly sweet taste, in China (Huang qui) and Japan where they are found under the name Kohki tea.

This drink is appreciated for its relaxing, detoxifying, and medicinal beneficial effects, in particular for treating diabetes and hyperlipidemia, and for lowering fever.

According to other preferred characteristics according to the invention:
  the extract is realized with leaves; and/or
  the extract is realized with an alcoholic solvent, preferably ethanol; and/or
  the extract is mixed with a physiological acceptable medium, the extract being preferably dry and diluted in the said physiological acceptable medium.

In vitro tests results are given below in the description. They show the efficacy of the cosmetic treatment according to the invention especially thanks to:
  the stimulation of elastin production by fibroblasts;
  the improvement of the number and the network quality of elastic fibres produced by fibroblasts;
  the improvement of the contractile capacity of fibroblasts; and
  the strengthening of the DEJ in keratinocytes and skin explants.

The treatment according to the invention is therefore adapted to increase the elastin synthesis of the extracellular matrix, improve the elastic fibres number and the network quality.

Besides, in vivo tests realized on a volunteer panel, whose facial skin quality is affected by aging, have shown the effectiveness of the cosmetic treatment according to the invention to improve skin sagging:
  improvement of the elastic properties of the facial skin;
  improvement of the facial features (contours, jowls);

reduction of the depth and volume of the eyelid fold;
reduction of the marionette line of the mouth contours; and
reduction of the roughness and the relief depth (relief smoothing)

The treatment according to the invention is advantageously a repairing treatment, reducing jowls and eyelids drooping, and the corresponding skin folds.

The extract according to the invention is particularly interesting for pre-menopausal or menopausal women who experience a drop in estrogenic hormones accelerating skin aging.

The present invention also provides a cosmetic composition containing an alcoholic extract from the leaves of *Engelhardtia* genus, preferably *Engelhardtia chrysolepis* Hance, in a physiological acceptable medium. The composition according to the invention can be more or less concentrated in *Engelhardtia* extract, thus forming either a cosmetic ingredient or a final cosmetic formulation intended for the consumer which can be prepared from this cosmetic ingredient. A composition according to the invention covers a dry extract content of between approximately 0.0001% and 10% relative to the total weight of the composition.

Preferably, this alcoholic extract is an ethanolic extract, and preferably yet, this extract is a dry extract, that is free of any traces of solvent used to obtained it, for example and preferably by vacuum evaporation of this solvent. Drying can also be done by azeotropic distillation, atomization, lyophilization or zeodratation.

According to the present invention, the term "physiologically acceptable medium" means, without being limiting, an aqueous or aqueous-alcoholic solution, alcoholic, glycolic or hydro-glycolic, a water-in-oil emulsion, an oil-in-water emulsion, a microemulsion, an aqueous gel, an anhydrous gel, a serum, a vesicle dispersion or a powder.

"Physiologically acceptable" means that the medium is suitable for a topical or transdermal use, in contact with mucous membranes, nails, scalp, hair, mammalian and more particularly human hair and skin, the composition capable of being ingested or injected into the skin, without risk of toxicity, incompatibility, instability, allergic response, and the like. This "physiologically acceptable medium" forms what is conventionally called the excipient of the composition.

A composition according to the invention can be applied to the face, the body, the neck, the scalp, the hair, the eyelashes, the body hairs, the nails, the lips in any form or vehicles known to those skilled in the art.

A composition according to the invention can be used in a vectorized form, in a bound form, incorporated or adsorbed on/to macro-, micro-, and nanoparticles, as capsules, spheres, liposomes, oleosomes, chylomicrons, sponges, microemulsions or nanoemulsions form, or adsorbed, for example, on powdery organic polymers, talc, bentonites, spores or exines and other mineral or organic supports.

A composition according to the invention can be provided in any galenic form and also be conveyed via a textile support made of natural or synthetic fibres, wool, or any material suitable for coming into contact with the skin, or which can be used in clothing, such as day or night underwear, handkerchiefs, or tissues, in order to permits cosmetic or dermatological effect through this skin/textile contact and allow topical delivery.

Particularly and advantageously, according to the invention, the composition can include one or more additional actives adapted to reinforce the activity and/or to act in a complementary manner on one or more other activities. These additional active agents can be incorporated at the stage of the ingredient intended for the formulator, or else at the final stage in the composition forming the cosmetic product intended for the consumer.

In cosmetic, applications can be provided in particular in the skin care lines for the face, body, hair and body hair and in makeup-care ranges. These additional actives can be of any categories according to their function, application site (body, face, neck, bust, hands, hairs, eyelashes, eyebrows, nails, lips, etc), final effect searched, and consumer target, for example antioxidant, tensing, moisturizing, nourishing, protective, smoothing, remodelling, volumizing (lipofilling), acting on the radiance of the complexion, anti-spots, concealer, anti-glycation, anti-aging, anti-wrinkle, slimming, soothing, myo-relaxing, anti-redness, anti-stretch marks, sunscreen, etc.

Preferably, the *Engelhardtia* extract according to the invention is mixed with an active promoting the stimulation of molecules of the dermal extracellular matrix such as collagen, elastin and/or hyaluronic acid.

As such, it is particularly interesting to combine the *Engelhardtia* extract according to the invention with one or more peptides chosen among peptides of sequences KTTKS (SEQ ID NO 1), GHK, GQPR (SEQ ID NO 2) and/or KTFK (SEQ ID NO 3), or an extract obtained by plant cell culture of *Leontopodium alpinum* or *Plantago lanceolata*. According to the invention, the terms "peptides of sequences" includes peptides used in a derived form, especially at the N-terminal and/or C-terminal positions, especially in an acylated form on the N-terminal position, for example in the form of an N-palmitoyl derivative, as well as complexes with metal ions and salt forms, in particular acetates and chlorine.

The following commercial ingredients can be mentioned, sold by the Applicant, as particularly interesting active ingredients to combine with the *Engelhardtia* extract according to the invention: Matrixyl® (including Pal-KTTKS (SEQ ID NO 4)), Matrixyl® 3000 (including a mixture of Pal-GQPR (SEQ ID NO 5) and Pal-GHK), Crystalide™ (including Pal-KTFK (SEQ ID NO 6)), MAJESTEM™ (including a *Leontopodium alpinum* cell extract) and/or SENESTEM™ (including a *Plantago lanceolata* cell extract).

KTTKS (for example SEQ ID NO 1 or SEQ ID NO 4) or KTFK (for example SEQ ID NO 3 or SEQ ID NO 6) sequences peptides are preferred because also advantageously they possess activities on the epidermis which are complementary to the activities on the dermis.

The combination of the *Engelhardtia* extract according to the invention with an agent that stimulates the elastin synthesis and improves the quality of elastic fibres is also particularly advantageous, especially for treating a mature skin. As such, the YR sequence peptide, sold under the tradename Idealift™ by the Applicant, containing the N-acetyl-Tyr-Arg-O-hexadecyl ester peptide, or the VGVAPG (SEQ ID NO 7) sequence peptide, sold in the form of Pal-VGVAPG (SEQ ID NO 8) derivative under the tradename Dermaxyl™.

The combination of the *Engelhardtia* extract according to the invention with hyaluronic acid or with a compound promoting its synthesis is also particularly advantageous.

Other actives can be considered in addition, for example moisturizing actives, acting on damages created by radiations (especially UV, IR, blue light).

The CTFA (("International cosmetic ingredient dictionary & handbook (20th Ed. 2020) published by "the Cosmetic, Toiletry, and Fragrance Association, Inc.", Washington, D.C.) describes a wide variety, without limitation, of cosmetic ingredients usually used in the skincare and scalp care industry, which are suitable for use as additional ingredients in the compositions of the present invention.

At least one compound chosen among vitamin B3, compounds as niacinamide or tocopherol, retinoids compounds as retinol, hexamidine, t α-lipoïc acid, resveratrol or DHEA, can be cited.

Other additional skin care actives that are particularly useful can be found in Sederma's commercial literature and at www.croda.com.

The following commercial actives can also be mentioned as examples: betain, glycerol, l'Actimoist Bio 2™ (Active organics), AquaCacteen™ (Mibelle AG Cosmetics), Aquaphyline™ (Silab), AquaregulK™ (Solabia), Carciline™ (Greentech), Codiavelane™ (Biotech Marine), Dermaflux™ (Arch Chemicals, Inc), Hydra'Flow™ (Sochibo), Hydromoist L™ (Symrise), RenovHyal™ (Soliance), Seamoss™ (Biotech Marine), Argireline™ (trade name for acetyl hexapeptide-3 of Lipotec), le spilanthol or an extract odf *Acmella oleracea* known under the trade name Gatuline Expression™, an extract of *Boswellia serrata* under the trade name Boswellin™, Deepaline PVB™ (Seppic), Syn-AKE™ (Pentapharm), Ameliox™ Bioxilift™ (Silab), PhytoCellTec™ Argan (Mibelle), Papilactyl D™ (Silab), Preventhelia™ (Lipotec), or one or more active ingredient following sold by Sederma: Subliskin™, Venuceane™, Moist 24™, Vegesome Moist 24™, Essenskin™, Juvinity™, Revidrat™, Resistem™, Chronodyn™, Kombuchka™, Chromocare™, Calmosensine™, Glycokin factor S™, Biobustyl™, Idealift™, Ceramide 2™, Ceramide A2™, Ceramide HO3™, Legance™, Intenslim™, Prodizia™, Beautifeye™, Pacifeel™, Zingerslim™, Meiritage™, Sebuless™, Apiscalp™, Rubistem™, Citystem™, Neonyca, NG Insaponifiables de Beurre de Karité™, Majestem™, Hydronesis™, Poretect™, Amberstem™, Synchrolife™, or mixture thereof.

Among plant extracts (in the form of classical plant extracts or prepared by an in vitro process) can be used as additional actives, there may more particularly be mentioned extracts of ivy, for example English Ivy (*Hedera helix*), of *Bupleurum chinensis*, of *Bupleurum falcatum*, of arnica (*Arnica montana* L), of rosemary (*Rosmarinus officinalis* N), of marigold (*Calendula officinalis*), of sage (*Salvia officinalis* L), of ginseng (*Panax ginseng*), of gingko biloba, of St.-John's-Wort (*Hyperycum perforatum*), of butcher's-broom (*Ruscus aculeatus* L), of European meadowsweet (*Filipendula ulmaria* L), of big-flowered Jarva tea (*Orthosiphon staminicus* benth), of artichoke (*Cynara scolymus*), of algae (*Fucus vesiculosus*), of birch (*Betula alba*), of green tea, of cola nuts (*Cola nipida*), of horse-chestnut, of bamboo, of *Centella asiatica*, of heather, of fucus, of willow, of mouse-ear, of escine, of cangzhu, of Chrysanthellum indicum, of the plants of the *Armeniacea* genus, *Atractylodis platicodon, Sinnomenum, pharbitidis, Flemingia*, de *Coleus* comme *C. forskohlii, C. blumei, C. esquirolii, C. scutellaroides, C. xanthantus* and *C. barbatus*, such as the extract of root of *Coleus barbatus*, extracts of *Ballote*, of *Guioa*, of *Davallia*, of *Terminalia*, of *Barringtonia*, of *Trema*, of *Antirobia, Cecropia, Argania, Dioscoreae* such as *Dioscorea opposita* or Mexican, extracts of *Ammi visnaga*, of *Siegesbeckia*, in particular *Siegesbeckia orientalis*, vegetable extracts of the family of Ericaceae, in particular bilberry extracts (*Vaccinium angustifollium*) or *Arctostaphylos uva ursi, Aloe vera*, plant containing sterols (e.g., phytosterol), Manjistha (extracted from plants of the genus *Rubia*, particularly *Rubia cordifolia*), and Guggal (extracted from plants of the genus *Commiphora*, particularly *Commiphora mukul*), kola extract, chamomile, red clover extract, *Piper methysticum* extract (Kava Kava™ from Sederma), Bacopa *monieri* extract (Bacocalmine™ from Sederma) and sea whip extract, extracts of *Glycyrrhiza glabra*, of mulberry, of *melaleuca* (tea tree), of *Larrea divaricata*, of *Rabdosia rubescens*, of *Euglena gracilis*, of *Fibraurea recisa* Hirudinea, of *Chaparral sorghum*, of sun flower extract, of *Enantia chlorantha*, of Mitracarpe of *Spermacocea* genus, of *Buchu barosma*, of *Law sonia inermis* L., of *Adiantium capillus-veneris* L., of *Chelidonium majus*, of *Luffa cylindrica*, of "Japanese Mandari" (*Citrus reticulata* Blanco var. *unshiu*), of *Camelia sinensis*, of *Imperata cylindrica*, of *Glaucium Flavum*, of *Cupressus sempervirens*, of *Polygonatum multiflorum*, of *Loveyly hemsleya*, of *Sambucus nigra*, of *Phaseolus lunatus*, of *Centaurium*, of *Macrocystis pyrifera*, of *Turnera diffusa*, of *Anemarrhena asphodeloides*, of *Portulaca pilosa*, of *Humulus lupulus*, of *Coffea arabica*, of *Ilex paraguariensis*, or of *Globularia cordifolia*, of *Oxydendron arboretum*, of *Albizzia julibrissin*, of *Zingimber zerumbet* smith, of *Astragalus membranaceus*, of *Atractylodes macrocephalae*, of *Plantago lanceolata*, of *Leontopodium alpinum* (or edelweiss), of *Mirabilis jalapa*, of *Apium graveolens*, of *Marrubium vulgare, Buddleja davidii* Franch, *Syringa vulgaris* or orchids.

The compositions of the present invention may include other peptides than the preferred peptides mentioned above, including, without limitation, di-, tri-, tetra-, penta- and hexapeptides and their derivatives. According to a particular embodiment, the concentration of the additional peptide(s), in the composition, ranges from $1\times10^{-7}\%$ and 20%, preferably from $1\times10^{-6}\%$ and 10%, preferably between $1\times10^{-5}\%$ and 5% by weight. The term "peptide" refers here to peptides containing 10 amino acids or less, their derivatives, isomers and complexes with other species such as a metal ion (e.g. copper, zinc, manganese, magnesium, and others). The term "peptides" refers to both natural peptides and (bio)synthetic peptides. It also refers to compositions that contain peptides and which are found in nature, and/or are commercially available.

Suitable dipeptides for use herein include but are not limited to Carnosine (βAH), YR, VW, NF, DF, KT, KC, CK, KP, KK, TT, PA, PM or PP.

Suitable tripeptides for use herein include, but are not limited to RKR, HGG, GKH, GHK, GGH, GHG, KGH, KHG, KFK, KAvaK, KβAK, KAbuK, KAcaK, KPK, KMOK, KMO₂K (MO₂ being a di-oxygenated sulfoxide methionine), KVK, PPL, PPR, SPR, QPA, LPA, SPA, K(Ac)HG or K(Ac)GH, K(Ac) being a lysine with the amine function of the lateral chain acetylated, as disclosed in WO2017/216177, K(P)HG or K(P)GH, K(P) being a lysine with its lateral chain grafted with a proline, K(Pyr)HG or K(Pyr)GH, K(Pyr) being a lysine with its lateral chain grafted with a pyroglutamic acid, K(Hyp)HG or K(Hyp)GH, K(Hyp) being a lysine with its lateral chain grafted with a hydroxyproline, as disclosed in WO2016/097965.

Suitable tetrapeptides for use as additional peptides herein include but are not limited to RSRK (SEQ ID NO 9), KTFK (SEQ ID NO 3), KTAK (SEQ ID NO 10), KAYK (SEQ ID NO 11) or KFYK (SEQ ID NO 12).

A suitable non limitative example of pentapeptide is the KTTKS (SEQ ID NO 1), and a suitable examples of hexapeptides are the GKTTKS (SEQ ID NO 13) and VGVAPG (SEQ ID NO 7).

Other suitable peptides for use according to the present invention can be selected, this list being not limitative, from: lipophilic derivatives of peptides, preferably palmitoyl (Pal)

derivatives or myristoyl (Myr), and metal complexes as aforementioned (e.g. copper complex of the tripeptide HGG or GHK). Preferred dipeptides include for example N-Palmitoyl-β-Ala-His, N-Acetyl-Tyr-Arg-hexadecylester (Calmosensine™, Idealift™ from Sederma), Pal-RT or Pal-KT (from Sederma). Preferred tripeptide derivatives include for example Pal-GKH and Pal-GHK (from Sederma), the copper derivative of HGG (Lamin™ from Sigma), Lipospondin (N-Elaidoyl-KFK) and its analogs of conservative substitution, N-Acetyl-RKR-NH$_2$ (Peptide CK+), N-Biot-GHK (from Sederma), Pal-KAvaK, Pal-KβAlaK, Pal-KAbuK, Pal-KAcaK, or Pal-KMO$_2$K (Matrixyl® synthe'6® from Sederma), Pal-KVK (Syn-Coll™ of DSM), and derivatives thereof.

Mention may also be made here of the anti-aging tripeptides of general Formula X-Pro*-Pro*-Xaa-Y described in WO2015181688 application with Xaa selected from Leu, Arg, Lys, Ala, Ser, and Asp, at the N-terminus, X chosen from H, —CO—R$^1$ and —SO$_2$—R$^1$ and at the C-terminal end Y chosen from OH, OR$^1$, NH$_2$, NHR$^1$ or NR$^1$R$^2$, R$^1$ and R$^2$ being, independently of one another, chosen from a alkyl, aryl, aralkyl, alkylaryl, alkoxy and aryloxy group, which may be linear, branched, cyclic, polycyclic, unsaturated, hydroxylated, carbonylated, phosphorylated and/or sulfurized, said group possibly possessing in its backbone a heteroatom particularly O, S and/or or N, and Pro* corresponding to Proline, an analogue or derivative thereof comprising, for example, Myr-PPL-OH and Myr-PPR-OH. Here can further be cited also the propigmenting and/or pro-mec dipeptides and tripeptides of general Formula X—(Xaa$_1$)n-Pro*-Xaa$_2$-Y disclosed in WO2014/080376, with n=0, 1 or 2, Xaa$_1$ an hydrophobic aminoacid selected from Ala, Val, Met, Leu, Iso, Phe, Pro, and analogs and derivatives thereof; or a polar aminoacid selected from Ser, Thr, Tyr, Asp, Glu and analogs and derivatives thereof; and when n=2 the two aminoacids Xaa$_1$ being the same or different; Xaa$_2$ being an hydrophobic aminoacid selected from Ala, Val, Met, Leu, Iso, Phe, and analogs and derivatives thereof, or a basic aminoacid selected from Arg, Lys, His, and analogs and derivatives thereof, at the N terminal end X being selected from H, —CO—R$_1$ and —SO$_2$—R$_1$; at the C terminal end Y being selected from OH, OR$_1$, NH$_2$, NHR$_1$ or NR$_1$R$_2$; R$_1$ and R$_2$ being, independently from each other, selected from an alkyl, aryl, aralkyl, alkylaryl, alkoxy et aryloxy group, that can be linear, branched, cyclic polycyclic, saturated, unsaturated, hydroxylated, carbonylated, phosphorylated and/or sulfured, said group having or not an O, S and/or N heteroatom in its skeleton and Pro* corresponding to a Proline, analog or derivative thereof, comprising for example the following peptides Pal-SPR-OH, Pal-PPR-OH, Pal-QPA-OH, Pal-LPAOH, Myr-SPA-OH, Pal-PM-OH, Pal-PA-OH and Pal-PP-OH.

Suitable tetrapeptide derivatives for use as additional peptides according to the present invention include, but are not limited to, Pal-KTFK (SEQ ID NO 6) or Ela-KTFK (SEQ ID NO 14), Ela-KTAK (SEQ ID NO 15), Ela-KAYK (SEQ ID NO 16) or Ela-KFYK (SEQ ID NO 17). Suitable pentapeptide derivatives for use as additional peptides herein include, but are not limited to, Pal-KTTKS (SEQ ID NO 4) (available as Matrixyl® from Sederma), Pal-YGGFXaa (SEQ ID NO 18) with Xaa being Leu or Pro, or mixtures thereof.

Suitable hexapeptide derivatives for use herein include, but are not limited to, Pal-VGVAPG (SEQ ID NO 8), Pal-GKTTKS (SEQ ID NO 19), Pal-HLDIIXaa with Xaa being Trp, Phe, Tyr, Tic, 7-hydroxy-Tic ou Tpi (SEQ ID NO 20) and derivatives thereof. The mixture of Pal-GHK and Pal-GQPR (SEQ ID NO 5) (Matrixyl® 3000, Sederma) can also be mentioned.

The following marketed peptides can be mentioned as well as additional active ingredients:

Vialox™ (INCI name=Pentapeptide-3 (synthetic peptide comprising alanine, arginine, isoleucine, glycine and proline)), Syn-ake™ (β-Ala-Pro-Dab-NH-Bzl) or Syn-Coll™ (Pal-Lys-Val-Lys-OH) marketed by Pentapharm;

Argireline™ (Ac-Glu-Glu-Met-Gln-Arg-Arg-NH$_2$ (INCI name=Acetyl hexapeptide-3) (SEQ ID NO 21), Leuphasyl™ (Tyr-D-Ala-Gly-Phe-Leu) (SEQ ID NO 22), Aldenine™ (Gly-His-Lys), Trylagen™ (INCI name=*Pseudoalteromonas* Ferment Extract, Hydro lyzed Wheat Protein, Hydro lyzed Soy Protein, Tripeptide-10 Citrulline (reaction product of Citrulline and Tripeptide-10 (synthetic peptide constituted of aspartic acid, isoleucine and lysine)), Tripeptide-1), Eyeseryl™ (Ac-β-Ala-His-Ser-His)(SEQ ID NO 23), Serilesine™ (Ser-Ile-Lys-Val-Ala-Val) (SEQ ID NO 24) or Decorinyl™ (INCI name: Tripeptide-10 Citrulline=reaction product of Citrulline and Tripeptide-10 (synthetic peptide constituted of aspartic acid, isoleucine and lysine) marketed by Lipotec;

Collaxyl™ (Gly-Pro-Gln-Gly-Pro-Gln (SEQ ID NO 25)) or Quintescine™ (Cys-Gly) marketed by Vincience;

Cytokinol™ LS (casein hydrolysate) marketed by Les Laboratoires Serobiologiques/Cognis;

Kollaren™ (Gly-His-Lys), IP2000™ (Pal-Val-Tyr-Val) or Meliprene™ (INCI name=Monofluoroheptapeptide-1: reaction product of acetic acide and a synthetic peptide comprising arginine, glycine, glutamic acid, histidine, norleucine, p-fluorophenylalanine and tryptophan) marketed by l'Institut Européen de Biologie Cellulaire;

Neutrazen™ (Pal-His-D-Phe-Arg-NH$_2$) marketed by Innovations; or

BONT-L-Peptide™ (INCI name=Palmitoyl Hexapeptide-19: reaction product of palmitic acid and Hexapeptide-19 (synthetic peptide constituted of asparagine, aspartic acid, lysine and methionine), Timp-Peptide™ (INCI name=Acetyl Hexapeptide-20: reaction product obtained by acetylation of Hexapeptide-20 (synthetic peptide constituted of alanine, glycine, lysine, valine and proline) or ECM Moduline™ (INCI name=Palmitoyl Tripeptide-28: reaction product of palmitic acid and Tripeptide-28 (synthetic peptide constituted of arginine, lysine and phenylalanine) marketed by infinitec Activos.

It is also possible to envisage combining the plant cells according to the invention with one or more cyclic peptides, in particular those extracted from linseed oil described in the Applicant's patent application FR1850845.

According to the invention, a method is also provided for improving the aesthetic appearance of the skin and its appendages comprising the topical application to the skin of an effective amount of a cosmetic or dermatological composition according to the invention such as described above.

«Topical treatment» or «topical use» means according to the invention, an application that is intended to act where it is applied: skin, mucosa and/or appendages.

The composition according to the invention may be applied locally to targeted areas.

The «effective» amount depends on various factors, such as the age, the condition of the skin and appendages of the person, seriousness of the disorder(s) or pathology, the administration mode, etc. An effective amount means a non-toxic amount enough to achieve the desired effect, more or less pronounced.

All percentages and ratios used herein are by weight of the total composition and all measurements are made at 25° C. unless it is otherwise specified.

For example, for a cosmetic treatment of the face, the European Cosmetics Directive has set a standard amount for applying a cream of 2.72 mg/cm$^2$/day/person and for a body lotion of 0.5 mg/cm$^2$/day/person.

According to other specific features, the cosmetic treatment method according to the invention can be combined with one or more other treatment methods targeting the skin such as lumino-therapy, heat, vibration, electroporation, micro-needle patch or aromatherapy treatments.

According to the invention, devices with several compartments or kits may be proposed to apply the method described above which may include for example and non-restrictively, a first compartment containing a composition comprising an active ingredient of the invention, and in a second compartment an excipient and/or an additional active ingredient and/, the compositions contained in the said first and second compartments in this case being considered to be a combination composition for a simultaneous, separate or stepwise use in time, particularly in one of the treatment methods recited above.

A composition according to the invention is also suitable for a therapeutic treatment of the skin at suitable doses.

DETAILED DESCRIPTION

The present invention will be better understood in the light of the following detailed description of an embodiment and of in vitro and in vivo tests.

This detailed description is made with reference to the drawings in which.

Figure 5:
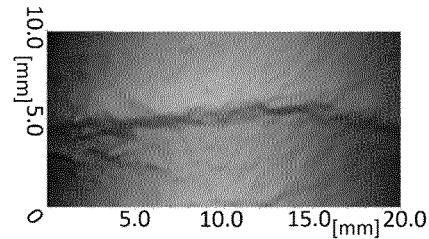
Figure 6:
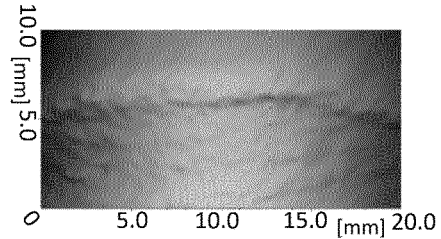

FIG. 5 also illustrates the improvement in skin sagging at the level of the eyelid fold on images captured by fringe projection of the same person before the treatment according to the invention; and FIG. 6 is similar to FIG. 5 showing results after the treatment.

A/ EXAMPLE OF A PREFERRED COSMETIC PREPARATION ACCORDING TO THE INVENTION, FORMING A CONCENTRATED INGREDIENT INTENDED FOR THE MANUFACTURE OF A GALENIC FORMULATION (SEE BELOW PARAGRAPH C/)

Preparation example of the *Engelhardtia* leaves extract according to the invention: crushed leaves of *Engelhardtia chrysolepsis* Hance are extracted at 15% reflux in ethanol (15 g of leaves in 100 mL). After cooling, the leaves are removed by coarse filtration. After cooling, the extract is filtered and then concentrated by vacuum evaporation of ethanol. The dry residue, constituting the dry extract, is then formulated in a matrix, for example of Glycerin/Water (approximately 80/20).

An active ingredient used in cosmetic industry generally comprises between 0.1% and 20% by weight of dry extract relative to the total weight of the ingredient, preferably between 1% and 5%.

This ingredient is generally formulated in a cosmetic formulation applicable on the skin between 0.1% and 20%, preferably between 1% and 10%, more preferably between 2% and 5%, by weight of ingredient relative to the total weight of the cosmetic formulation.

B/ IN VITRO EFFICACY TESTS

They were made on equivalents of the extract according to the invention titrated at 1.110% by weight of dry extract (hereinafter called «extract according to the invention» at 0.5; 1; 2 or 3% of this extract. These doses correspond to those at which the extract according to the invention will be recommended for a cosmetic treatment according to the invention. These equivalents were made from the dry extract diluted in the test excipients (for example culture medium).

1/ Elastin Production by Fibroblasts

Principle

Human fibroblasts from the dermis of various elderly women nearing menopause were used.

Protocol

The cells as they reached confluency, were brought into contact or not (for the control cases) with the extract according to the invention in culture medium, then incubated at 37° C. and 5% $CO_2$ for 5 days. After this contact, cell layers were rinsed, fixed and stained with anti-elastin antibody. The labelling was revealed using a fluorescent secondary antibody and photographs captured under a microscope. Image analysis on these photographs allowed elastin production to be quantified. A counter-labelling of the nuclei was performed using the fluorescent dye HOESCHT 33258, which marks the DNA, to evaluate the cell population and thus to weight the fluorescence data obtained.

Results

Variation of elastin production by fibroblasts of a donor close to menopause. Effect of the extract according to the invention at 0.5% compared to the control (n=3):

TABLE 1

| Age of donor | 44 years | 47 years | 48 years |
| --- | --- | --- | --- |
| Extract according to the invention vs. Control | +63% | +53% | +94% |
| Significance | $p < 0.01$ | $p < 0.01$ | $p < 0.01$ |

These results show that the extract according to the invention stimulates the production of elastin by fibroblasts.

2/ Quality of the Elastic Fibre Produced by Fibroblasts

Protocol

On the same culture as above, immunolabeled, after binarization of the photographs, the fibre quality can be estimated with a system of images analyse evaluating three parameters: the length of fibres produced in the culture, the number of fibres produced and the complexity of the network formed, each of the parameters being reduced to a number of cells by countermarking using the HOESCHT 33258 method, to weight the information.

Results

Variation of the elastic fibre quality produces by the fibroblasts of the donor of 44 years: the fibres length, the fibres number and the complexity of fibre network. Effect of the extract according to the invention at 0.5% compared to the control (n=3):

TABLE 2

|  | Fibres length | Fibres number | Network complexity |
|---|---|---|---|
| Extract according to the invention vs. Control | ×12.5 | ×14.5 | ×16.7 |
| Significance | p < 0.01 | p < 0.01 | p < 0.01 |

The image analysis system used shows that thanks to the treatment according to the invention, the fibres are longer (×12.5), more abundant (×14.5) and more connected (×16.7) compared to the control cases.

Figure 3:
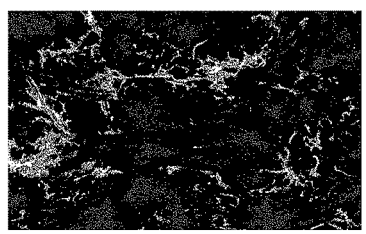
FIG. 3 illustrates the improvement of the elastic fibres network on photographs under microscope (after immunocytochemical labelling of elastin) of the same person before the cosmetic treatment according to the invention.
Figure 4:
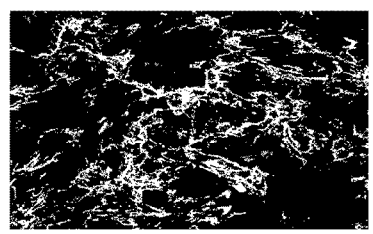
FIG. 4 is similar to FIG. 3 showing results after 5 days of treatment.

This is clearly visible on the images of FIGS. 3 and 4.

3/ Elastin Production of MFAP4 and Fibulin 5, Proteins that Mark Elastic Fibres by Fibroblasts Principle This test is complementary to the previous one providing quantified data on the production of three key proteins for the construction of the elastic fibre. It was realized by LC-MS/MS (Liquid Chromatography Coupled Tandem Mass Spectrometry)

Protocol

The extract according to the invention at 0.5% was brought into contact or not (for the control cases) for 7 days with Normal Human Fibroblasts (NHF). After this contact, cell layers were crushed with an adapted buffer and the protein were dosed. Aliquots of these crushed, all containing the same amount of proteins, were recovered and cut specifically using a protease that creates peptide fragments more or less longs. First, the peptides were separated by liquid chromatography according to their hydrophobicity, then ionized, then separated in a detector which classifies them according to their mass and their charge (m/z). A software (Mascot™) was used to analyse the masses and the charge of each element and deduce the presence and quantity of pre-existing proteins. Then, these data were processed by a bioinformatics/biostatistics analysis to identify the biological processes and the metabolic pathways modulated by the extract according to the invention. The results are expressed as an expression ratio between the treated case and the control case. A ratio greater than 1.5 is considered as an increase in the production of the target protein (+50% compared to the control). A study of variances and a Student's t test were carried out to judge the significance of the results.

Results

Variation of three key proteins in the elastic fibre formation. Dosage by LC-MS/MS. Effect of the extract according to the invention at 0.5% compared to the control (n=3).

TABLE 3

|  | Elastin | MFAP4 | Fibulin 5 |
|---|---|---|---|
| Extract according to the invention vs. Control | ×12.6 | ×3.24 | ×1.6 |
| Significance | p < 0.01 | p < 0.01 | p < 0.01 |

These proteomics data confirm that the extract according to the invention does indeed stimulate the elastin production and two essential elements of the mature elastic fibre.

4/ Preservation of the Epidermal Junction (DEJ) on Skin Explants and Keratinocytes Protocol To confirm the effect of the extract according to the invention on two DIE components, the collagen IV and the laminin 5, a gel containing 3% of this extract or a Placebo gel was applied daily to the surface of skin explants of a woman close to menopause. Then, the skins were selected and the collagen IV and laminin 5 synthesis were revealed by immunohistochemistry (marks of the sections with a first antibody specific for the protein to be assayed and revelation of this labelling by a fluorescent secondary antibody specific of the first antibody). Then, the intensity of the labelling was quantified by image analysis of the taken photographs.

Furthermore, the extract according to the invention at 0.5% or its placebo (control) was applied on human keratinocytes in culture and collagen VII synthesis was measured by ELISA on cellular extract after crushing. The results were reduced to the number of cells evaluated by counter-labelling of the nuclei using the fluorescent dye Hoechst 33258, which marks the DNA.

Results

Stimulation of Collagen IV and Laminin V synthesis on skin explants. Effect of the extract according to the invention at 3% (n=5):

TABLE 4

|  | Collagen IV variation (%) | Laminin V variation (%) |
|---|---|---|
| Placebo | Reference | Reference |
| Extract according to the invention at 3% | +27%; p < 0.01 | +17%; p < 0.01 |

Variation of collagen VII synthesis measured by ELISA method on human keratinocytes in culture. Effect of the extract according to the invention (n=3):

TABLE 5

|  | Collagen VII variation (%) |
|---|---|
| Control | Reference |
| Extract according to the invention at 0.5% | +36%; p < 0.01 |
| Extract according to the invention at 3% | +148%, p < 0.01 |

All these results show that the extract according to the invention has a direct reinforcing action of the DIE by stimulating the synthesis of three essential components of this JDE: collagen VII (+148%; p<0.01), shown on keratinocytes; collagen IV (+27%; p<0.01) and Laminin V (+17%; p<0.01), shown on skin explants.

The extract according to the invention can thus improve the aging of the skin when linked to a disorganization of the DJE, by counteracting the caused loss of flexibility and elasticity.

5/ Contraction and cell resilience

Principle

The contraction function of fibroblasts is important for ensuring a good elasticity to the skin. The application on fibroblasts of the glycating substance (MGO: methylglyoxal) allows to mimic in accelerate the loss of contractility of fibroblasts occurring during aging.

Protocol

Fibroblasts were brought into contact with the MGO for 2 days, in nontoxic quantity, with or without the extract according to the invention. After this contact, the cells were included in a collagen gel to form a dermis equivalent called lattice. Fibroblasts anchor themselves to the collagens and begin to contract the gel like they do in the skin. This contraction was followed after 16 h and measured using an ImageQuant LAS4000 imager by following the modification on the gel surface.

Results

Variation of the stressed fibroblasts contraction. Effect of the extract according to the invention at 0.5% (n=3):

TABLE 6

| Gel surface | Gel contraction at 16 h (%) | Decrease of contraction variation (%) |
|---|---|---|
| Control without MGO | 100% | Reference |
| MGO | 59.9% | 40.1; p < 0.01 |
| MGO + 0.5% of the extract according to the invention | 93.8% | −6.2%; nsd | nsd: non-significant difference

These results show that the MGO in a non-cytotoxic amount strongly delays the contraction in the control cases (−40% compared to the non-stressed control) and that the presence of the extract according to the invention at 0.50% can avoid this contraction delay and recover a contraction value not significantly different from the non-stressed control.

C/ GALENIC/EXAMPLE OF PREPARATION OF A COMPOSITION ACCORDING TO THE INVENTION

This composition is a cosmetic cream containing the active ingredient described in point A/above at 1.11% by weight of the dry *Engelhardtia* extract.

TABLE 7

| Raw material | INCI name | % |
|---|---|---|
| Part A: | | |
| $H_2O$ | Water | qsp100 |
| Carbopol ™ Ultrez 10 | Carbomer | 0.30 |
| Part B: | | |
| Brij S2-SS-(RB) ™ | Steareth-2 | 0.40 |
| Brij S10-SO-(RB) ™ | Steareth-10 | 1.20 |
| Crodafos CES-PA-(RB) ™ | Cetearyl Alcohol (and) Dicetyl Phosphate (and) Ceteth-10 Phosphate | 4.00 |
| Crodacol CS90-PA-(RB) ™ | Cetearyl Alcohol | 1.50 |
| Crodamol AB-LQ-(RB) ™ | C12-15 Alkyl Benzoate | 1.50 |
| Crodamol OSU-LQ-(JP) ™ | Diethylhexyl Succinate | 7.00 |
| Part C: | | |
| Glycerin | Glycerin | 2.50 |
| Octanediol | Caprylyl Glycol | 0.50 |
| Part D: | | |
| Phenoxyethanol | Phenoxyethanol | qs |
| Part E: | | |
| Potassium sorbate | Potassium Sorbate | qs |
| Part F: | | |
| $H_2O$ | water | 4.50 |
| NaOH 30% | Sodium Hydroxide | 0.45 |
| Part G: | | |
| Ingredient according to the invention | / | 3.00 |

To this composition can preferably be added an ingredient stimulating the molecules of the extracellular matrix, in particular collagen, such as:

MATRIXYL® and/or

CRYSTALIDE®, described above and marketed by Sederma.

Optionally, other ingredients can be added, for example:

A soothing ingredient for sensitive skin such as PACIFEEL™, marketed by Sederma, comprising an extract of *Mirabilis jalapa*.

A moisturizing ingredient such as:

AQUALANCE™, marketed by Sederma, osmoprotective moisturizing active ingredient composed of homarine and erythritol.

REVIDRATE™, marketed by Sederma, that in particular improves the cohesion of the epidermis and its hydration.

An ingredient acting on the radiance of the complexion such as EVERMAT™, marketed by Sederma, comprising a combination of an *Enantia chlorantha* extract rich in protoberberines and oleanolic acid; decreasing pore size and brightness; refining the grain of acne-prone skin.

A moisturizing/smoothing ingredient such as OPTIM HYAL™, sold by Sederma, containing acetylated glucuronic acid oligosaccharides having a structure analogous to hyaluronic acid fragments.

A sebo-regulator ingredient such as:

SEBULESS™, marketed by Sederma, comprising an extract of *Syringa vulgaris* obtained by in vitro cell culture, which is a sebum regulator, purifying, mattifying and refreshing complexion, and blurring imperfections.

PORETECT™, marketed by Sederma, comprising a combination of flaxseed and celery extracts titrated in cylolinopeptides and senkyunolides, which provides firmness, tone and density to the skin, thereby strengthening the pore-retaining structures which collapse with ageing.

An ingredient acting on the elastic properties of the skin/skin barrier such as:

IDEALIFT™, marketed by Sederma, comprising the N-acetyl-Tyrosyl-Arginyl-O-hexadecyl ester lipodipeptide, fighting the flaccidity of the face and improving the resistance to gravity, via in particular an elastin stimulation.

DERMAXYL™, marketed by Sederma, combining ceramide 2, a cement of the stratum corneum, and the Pal-Val-Gly-Val-Ala-Pro-Gly, a palmitoyled matrikine, which smoothes wrinkles and repairs the cutaneous barrier.

An anti-fatigue ingredient such as PRODIZIA™, marketed by Sederma, including an extract of *Albizia julibrissin*, which promotes the visible reduction of signs of fatigue: dark circles, undereye bags, dull complexion and drawn features, by repairing and protecting the skin from damages caused by glycation. An antipollution ingredient such as CITYSTEM™, marketed by Sederma, based on plant cells obtained in vitro from *Marrubium vulgare* with a high Forsythoside B concentration; used against pollution attacks: makes the skin soft and smooth, refines skin texture, reduces the visibility of blackheads, leaving the skin radiant and purified.

D/ IN VIVO STUDIES

Principles

The efficacy of the cosmetic treatment of the invention was evaluated on a total of 90 female volunteers during two complementary studies: one on a Caucasian panel and the other on Chinese volunteers. They had to present visible signs of ageing on the face: skin sagging, loss of harmony in features, relief and contour, loss of skin elasticity in this area. All the volunteers were close to the average age of menopause or post-menopausal for several years. The studies carried out used metrological means (measurements), expert analyses (judgements) and self-assessments (perceived effects).

These two studies, conducted independently of each other, allow to evaluate facial sagging, the loss of viscoelastic properties and changes in terms of folds and relief.

They were conducted over a period of two months, versus a placebo cream and consisted of:

Harmony of Features
  Measurement of the facial contour using a fringe projection device
  Measurement of the facial jowls using a fringe projection device
  Jowl evaluation by experts from photographs
Viscoelastic Properties of the Face:
  Measurement of jowl elasticity using an ElastiMeter™,
  Measurement of facial skin elasticity using a Cutometer™,
  Measurement of facial skin resilience/recovery after stress using a Cutometer™
Eyelid Appearance:
  Measurement of eyelid fold height using a fringe projection device,
  Measurement of the volume of this fold using a fringe projection device,
  Measurement of fold area using a fringe projection device,
  Evaluation of the drooping appearance of the eyelid by experts from photographs,
  Perception of the tired appearance of the eyes by the volunteers
Marionette Lines Around the Mouth:
  Measurement of marionette lines depth by fringe projection
  Evaluation on photographs of the sagging around the mouth by experts
  Visual and tactile evaluation by experts of roughness Protocol The study on the Caucasian volunteers was carried out in France with a maximum of 38 women volunteers with an average age of 57 years (49-66 years). Regarding the distribution of volunteers according to the number of years post-menopausal, 60% had been post-menopausal for 0-5 years (including 34% between 0 and 2 years) and 40% had been post-menopausal for 6-10 years (including 32% between 6 and 8 years).

The study on the Chinese volunteers was carried out in China (Guangzhou) on a maximum of 52 women with an average age of 56 years (51-60 years) who presented a menopause established for less than 7 years.

Type of Study, Duration and Applications

The volunteers did not know the type of product they were applying (active or placebo) onto their face for 8 weeks.

The panel of 38 women was divided into two as follows:
  20 women applying a cream according to the invention morning and evening (cream described in table 7)
  18 women applying a placebo cream morning and evening (the same formula without the active ingredient according to the invention)

Different measurements and entries were taken on several devices, before and after the applications, according to the table 8 below.

TABLE 8

| T0 ---------------------------------------> | T8 weeks |
|---|---|
| Fringe projection (Contour, jowls, eyelids) | Fringe projection (Contour, jowls, eyelids) |
| Elasticity (Elastimeter ™) | Elasticity (Elastimeter ™) |
| Photos (expert judgement, self-assessments) | Photos (expert judgement, self-assessments) |

The panel of 52 Chinese women was divided into two as follows:
  26 women applied a cream according to the invention morning and evening (cream describes in table 7)-26 women applied a placebo cream morning and evening (the same formula without active according to the invention).

Different measurements were taken, before and after the applications, according to the table 9 below.

TABLE 9

| T0 --------------------------> | T4 weeks ----------> | T8 weeks |
|---|---|---|
| Fringe projection (marionette lines) | Fringe projection | |
| Elasticity, resilience (Cutometer ™) | | Elasticity, resilience |
| Clinical evaluation (roughness) Photos | Clinical evaluation Photos | Clinical evaluation Photos |

Statistics

The statistical studies were conducted using the relevant Student's t, the non-parametric Wilcoxon or the Mann-Whitney test. To compare the effect with T0, bilateral tests were carried out on paired series. To compare the products with each other, bilateral tests were carried out on unpaired series. For questionnaire evaluations, a Khi-2 test was used.

Methods and Results

1. Evaluation of Facial Feature Sagging: Contour/Jowls

Concerning the measurement of the facial contour (the facial oval), the volunteers were installed in a fringe projection bench combined with a stereometric measurement to ensure that the volunteer was positioned exactly the same way after several weeks. Feature shadows (fringes) were projected onto the face, and their deformations, caused by skin relief, were measured by triangulation. This technology allows a three-dimensional reconstruction of the relief. The length of the developed contour was measured, using identical anatomical landmarks between both times.

For the jowls, a volume on a skin area on the jaw where the jowls appear was measured, in exactly the same place at both time points.

1.1. Fringe Projection: Effect of the Treatment According to the Invention on Variations of Sagging Facial Contour and Jowls

TABLE 10

|  | Contour length (mm) | | | | Jowl volume (mm³) | | | |
| --- | --- | --- | --- | --- | --- | --- | --- | --- |
|  | Invention | | Placebo | | Invention | | Placebo | |
|  | T0 | T8 weeks | T0 | T8 weeks | T0 | T8 weeks | T0 | T8 weeks |
| Mean | 110.5 | 108.4 | 106.8 | 110.2 | 1334 | 1225 | 1313 | 1355 |
| Standard deviation | 10.4 | 8.9 | 8.9 | 12.6 | 239 | 334 | 280 | 364 |
| Variation (%) vs. T0 |  | −1.9% |  | +3.2% |  | −8.2% |  | +3.2% |
| Significance |  | p < 0.06 |  | nsd |  | p < 0.06 |  | nsd |
| Maximum |  | −10% |  |  |  | −41% |  |  |
| Responders |  | 71% |  |  |  | 69% |  |  |
| Variation; significance; Invention vs. Placebo |  | −5.1%; p < 0.05 |  |  |  | −11.4%; p < 0.05 |  |  | nsd: non significant difference vs T0

These results show a marked improvement in facial contour in volunteers who used the treatment according to the invention compared placebo (−5.1%; p<0.05).

Moreover, there was a marked improvement in the jowls, whose volume was significantly reduced after the treatment according to the invention compared to T0 (−8.2%, p<0.06), which was not the case in the volunteers who used the Placebo (nsd). The difference between the two groups is clearly in favour of the treatment according to the invention, since a total reduction of −11.4% was observed, which was significant relative to placebo (p<0.05). The face is therefore tightened and more harmonious.

1.2. Expert Evaluation from Standardised Photographs of Jowls

Standardised photographs were taken at T0 and T8 weeks using a photograph bench equipped with a high-definition digital camera, specific lighting and a system used to position the volunteers identically at the different time points. Six experts examined the photos and judged the jowl improvement (reduction of facial skin sagging).

The results indicate that, among the volunteers who used the treatment according to the invention, there was a clear improvement of the jowls, which appeared less saggy than at T0 in 34% of cases. The experts indicated that an improvement was only perceived in 14% of the volunteers who used the placebo. The invention/placebo difference is significant (p<0.05) in favour of the treatment according to the invention.

1.3. Evaluation of the Biomechanical Properties of Facial Skin

The elasticity of the skin of the jowls was measured on the Caucasian panel using an ElastiMeter™ which can measure skin elasticity in a very reproducible manner. This measurement tool uses a probe fitted with a piston that imposes constant deformation on the skin using a metal rod. The skin's resistance to this deformation is recorded. The device has a tracking system that identifies contact with the skin. The elasticity and resilience of the cheek skin upon deformation were measured in the Chinese volunteers using a Cutometer® MPA580. This device, which is derived directly from the Fermometer®, sucks the skin into a small tube. It is widely used to evaluate the effects of cosmetic products. It has been used to show the correlation between changes in the biomechanical properties of the skin and the age of volunteers, in particular for the face (MONDON et al., 2010). The parameters studied were the Ur/Ue and Ur/Uf ratios, both closely related to skin elasticity. These parameters are recommended when evaluating the anti-ageing effects of cosmetic products (KRUEGER et al., 2011).

1.3.1 Elastimeter™ Results Obtained: Variation of Jowls Skin Elasticity; N=35; 5 Measurements/Site:

TABLE 11

|  | Invention | | Placebo | |
| --- | --- | --- | --- | --- |
| Skin elasticity (N/m) | T0 | T8 weeks | T0 | T8 weeks |
| Mean | 35.06 | 37.87 | 35.35 | 35.29 |
| +/−Standard deviation | +/−3.41 | +/−5.56 | +/−3.85 | +/−3.60 |
| % variation vs. T0 |  | +8.01% |  | −0.17% |
| Significance |  | p < 0.05 |  | nsd |
| Maximum |  | +47% |  |  |
| Responders |  | 72% |  |  |
| Improvement (%) and significance; invention vs. placebo |  | +8.18%; p < 0.05 |  |  |

These results show that the elastic properties of the skin of volunteers who applied the cream according to the invention were improved by 8.18%. This was significant (p<0.05) compared to the placebo cream, which did not give rise to any changes (−0.17, nsd vs T0).

1.3.2. Cutometer™ Results Obtained: Variation of Jowls Skin Elasticity Parameters; N=51 Volunteers, n=3 Measurements/Site:

TABLE 12

| | Ur/Ue-Elasticity | | | | Ur/Uf-Recovery rate | | | |
|---|---|---|---|---|---|---|---|---|
| | Invention | | Placebo | | Invention | | Placebo | |
| | T0 | T8 weeks | T0 | T8 weeks | T0 | T8 weeks | T0 | T8 weeks |
| Mean | 0.414 | 0.484 | 0.421 | 0.433 | 0.300 | 0.329 | 0.297 | 0.296 |
| +/−Standard deviation | +/−0.08 | +/−0.08 | +/−0.70 | +/−0.08 | +/−0.06 | +/−0.05 | +/−0.05 | +/−0.05 |
| General average of % variations vs. T0 | | +16.9% | | +2.9% | | +9.7% | | +1.0% |
| Significance | | $p < 0.01$ | | nsd | | $p < 0.01$ | | nsd |
| Maximum | | +81% | | | | +52% | | |
| Respondeurs | | 85% | | | | 73% | | |
| Improvement (%) and significance; invention vs. Placebo | | +14%; $p < 0.05$ | | | | +10.7%; $p < 0.05$ | | |

These results obtained with Chinese volunteers fully confirm those obtained with Caucasian volunteers. They show that, on the faces of post-menopausal women, the use of the cream according to the invention very favourably improves the age-related elasticity parameters studied. Compared to placebo, the elasticity is 14% ($p<0.05$) and 10.7% better for skin recovery ($p<0.05$).

2. Eyelid Evaluation (Fold, Drooping Appearance, Fatigue)

2.1. Evaluation of the Eyelid Fold

This fold was study on Caucasian volunteers, according to a protocol using fringe projection (illustrated in FIGS. 5 and 6). Three parameters of the «bulge» of eyelid were extracted: maximum height, volume and occupied area.

Results: Upper eyelid fold, variation of height and volume eyelid fold; N=29

TABLE 13

| | Maximum height (mm) | | | | Volume (mm$^3$) | | | |
|---|---|---|---|---|---|---|---|---|
| | Invention | | Placebo | | Invention | | Placebo | |
| | T0 | T8 weeks | T0 | T8 weeks | T0 | T8 weeks | T0 | T8 weeks |
| Mean | 0.394 | 0.291 | 0.366 | 0.361 | 2.7 | 1.3 | 2.4 | 1.9 |
| +/−Standard deviation | 0.150 | 0.153 | 0.229 | 0.121 | 1.4 | 0.8 | 2.2 | 1.0 |
| % variation vs. T0 | | −26.1% | | −1.4% | | −52% | | −20% |
| Significance | | $p < 0.01$ | | nsd | | $p < 0.01$ | | nsd |
| Maximum | | −52% | | | | −78% | | |
| Responders | | 100% | | | | 100% | | |
| Reduction (%) and significance; Invention vs. Placebo | −24.7%; $p < 0.05$ | | | | −32%; $p < 0.05$ | | | |

Results: upper eyelid fold, variation of the occupied surface; N=29:

TABLE 14

| | Projected area (in mm$^2$) | | | |
|---|---|---|---|---|
| | Invention | | Placebo | |
| | T0 | T8 weeks | T0 | T8 weeks |
| Mean | 21.9 | 16.5 | 18.8 | 19.8 |
| +/−Standard deviation | 6.8 | 4.7 | 8.0 | 6.8 |
| % variation vs. T0 | | −24.7% | | +5.3% |
| Significance | | $p < 0.01$ | | nsd |
| Maximum | | −45% | | |
| Responders | | 100% | | |
| Reduction (%) and significance; Invention vs. Placebo | | −30%; $p < 0.01$ | | |

These results show that the treatment according to the invention can very significantly reduce the fold of the upper eyelid after two months of use. In parallel, the use of the placebo tends to reduce one of the parameters (volume), though never significantly.

The maximum height is significantly reduced by 24.7% compared to placebo (p<0.05). The volume of this fold is greatly reduced according to the invention (−32%, p<0.05 vs placebo). Besides, it must be noted that the projected surface area of this small wrinkle is significantly reduced by 30% versus placebo cases (p<0.01).

2.2. Expert Evaluation of the Drooping Eyelid Parameter

The technique described in paragraph 1.2 was used. Six experts examined the photographs and judged the drooping appearance of the Caucasian panel's eyelids.

Figure 1:
FIG. 1 illustrates the improvement of skin sagging on the eyelid fold on photographs of the same person before the cosmetic treatment according to the invention (left part of the Figure) and after the treatment (right part of the Figure)

The results indicate that, for the volunteers who used the cream according to the invention, there is a marked improvement, that is eyelids appearing less droopy than at T0 in 510% of the cases. The experts indicated that an improvement was only perceived in 310% of the 15 volunteers who used the placebo. The 20% difference is significantly (p<0.05) in favour of the invention (illustrated in FIG. 1 in which it is clearly seen that the eyelid is tightened, the fold being clearly less visible).

2.3. Evaluation by Volunteers of the Eye Fatigue Parameter

The 38 Caucasian volunteers judged if their eyes seemed more or less tired, in front of their mirror, after two months of using the cream according to the invention.

The results indicate that, for the 20 volunteers who used the cream according to the invention, there is a marked improvement, that is the eyes appear less tired than at T0 in 80% of cases. For the 18 volunteers who used the placebo, the improvement was perceived in only 39% of cases. The difference of 41% is very clearly in favour of the invention (p<0.01 vs. placebo).

3. Evaluation of the Marionette Lines (Mouth) and the Relief

These parameters were evaluated on the Chinese volunteers. They were installed in a fringe-projection system combined with a stereometric measurement tool (detailed above). Photographs of the volunteers were also taken.

Figure 2:
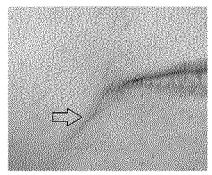
FIG. 2 shows the marionette line localisation at the start of the mouth.

3.1 Depth of Marionette Lines (FIG. 2) after One Month

Results: depth variation of marionette lines after 1 month; N=52:

TABLE 15

| Depth (in mm) | Invention | | Placebo | |
| --- | --- | --- | --- | --- |
| | T0 | T4 weeks | T0 | T4 weeks |
| Mean | 0.216 | 0.201 | 0.216 | 0.233 |
| +/−Standard deviation | +/−0.10 | +/−0.09 | +/−0.08 | +/−0.08 |
| General average of % variations vs T0 | | −6.9% | | +7.9% |
| Significance | | p < 0.15 | | p < 0.05 |
| Maximum | | −36% | | |
| Responders | | 65% | | |
| Improvement (%) and significance; Invention vs. Placebo | | 14.8%; p < 0.05 | | |

The results show that the depth of the marionette lines displayed a reduction trend of 6.9% relative to T0 for volunteers who used the cream according to the invention, while for those who used placebo, there was a significant degradation of 7.9% of the fold observed over this same 1-month period. The comparison of the two cases is, however, in favour of the invention, since the 14.8% difference is significant (p<0.05 vs. placebo).

3.2. Skin Relief
3.2.3 Skin Relief Around the Crow's Feet

This parameter was evaluated on Caucasian volunteers. The roughness parameters of the crow's feet were monitored. 50 successive profiles were created per case.

Results: Changes in roughness in the corner of the eye; N=30

TABLE 16

| | Roughness (μm) | | | |
| --- | --- | --- | --- | --- |
| | Invention | | Placebo | |
| | T0 | T8 weeks | T0 | T8 weeks |
| Mean | 25.0 | 20.0 | 19.0 | 17 |
| +/−Standard deviation | +/−6.0 | +/−4.0 | +/−4.0 | +/−3.0 |
| % variation vs. T0 | | −20% | | −10.5% |
| Significance | | p < 0.01 | | p < 0.01 |
| Maximum | | −35% | | |
| Responders | | 100% | | |
| Reduction (%) and significance; Invention vs. Placebo | | −9.5%; p < 0.05 | | |

The results show that the relief of the skin is improved after application of the cream according to the invention for 8 weeks. Indeed, there was a 20% overall decrease in roughness. The placebo also has a more moderate effect. However, the difference between product and placebo is significantly in favor of the invention (−9.5%; p 0.05).

3.3. Evaluation of Roughness after 1 Month.

This parameter was evaluated on Chinese volunteers. In addition to the metrological aspect seen above, showing the clear improvement in the roughness of the corner of the eye, an expert visually and tactilely evaluated the roughness of the skin of the volunteers at T0 and at 1 month using a 10-point scale of scores ranging from soft (0) to rough (9).

Results: variations in the roughness of the facial skin of volunteers after 1 month; N=52:

TABLE 17

| | Invention | | Placebo | |
| --- | --- | --- | --- | --- |
| Roughness | T0 | T4 weeks | T0 | T4 weeks |
| Mean +/− Standard deviation | 6.23 +/−1.03 | 5.88 +/−1.07 | 6.69 +/−1.05 | 6.62 +/−0.98 |
| % variation vs. T0 | | −5.62% | | −1.04% |
| Significance | | p < 0.01 | | nsd |
| Maximum | | −33% | | |
| Respondeurs | | 31% | | |
| Improvement (%) and significance; Invention vs. Placebo | | −4.6%; p < 0.06 | | |

These results indicate that the expert clearly perceived an improvement in the roughness of the face of the volunteers who applied the cream according to the invention (−5.6% vs. T0, p<0.01). Compared to volunteers who applied the placebo, the difference is clearly in favour of the invention (−4.6% vs. placebo; p<0.05).

The invention claimed is:

1. A non-therapeutic cosmetic method of treating sagging skin consisting of topically applying a plant extract of the genus *Engelhardtia* to the sagging skin,
   wherein the extract is derived from leaves of the plant using an alcoholic solvent, and
   wherein the treatment increases skin elasticity.

2. The method according to claim 1, wherein the plant corresponds to the species *Engelhardtia chrysolepsis* Hance.

3. The method according to claim 1, wherein the alcoholic solvent is ethanol.

* * * * *

SEQUENCE LISTING

<160> NUMBER OF SEQ ID NOS: 25

<210> SEQ ID NO 1
<211> LENGTH: 5
<212> TYPE: PRT
<213> ORGANISM: artificial sequence
<220> FEATURE:
<223> OTHER INFORMATION: synthetic peptide

<400> SEQUENCE: 1

Lys Thr Thr Lys Ser
1               5

<210> SEQ ID NO 2
<211> LENGTH: 4
<212> TYPE: PRT
<213> ORGANISM: artificial sequence
<220> FEATURE:
<223> OTHER INFORMATION: synthetic peptide

<400> SEQUENCE: 2

Gly Gln Pro Arg
1

<210> SEQ ID NO 3
<211> LENGTH: 4
<212> TYPE: PRT
<213> ORGANISM: artificial sequence
<220> FEATURE:
<223> OTHER INFORMATION: peptidic compound

<400> SEQUENCE: 3

Lys Thr Phe Lys
1

<210> SEQ ID NO 4
<211> LENGTH: 5
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end

<400> SEQUENCE: 4

Lys Thr Thr Lys Ser
1               5

<210> SEQ ID NO 5
<211> LENGTH: 4
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end

<400> SEQUENCE: 5

Gly Gln Pro Arg
1

<210> SEQ ID NO 6

```
<211> LENGTH: 4
<212> TYPE: PRT
<213> ORGANISM: Artificial sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end

<400> SEQUENCE: 6

Lys Thr Phe Lys
1

<210> SEQ ID NO 7
<211> LENGTH: 6
<212> TYPE: PRT
<213> ORGANISM: artificial sequence
<220> FEATURE:
<223> OTHER INFORMATION: synthetic peptide

<400> SEQUENCE: 7

Val Gly Val Ala Pro Gly
1               5

<210> SEQ ID NO 8
<211> LENGTH: 6
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end

<400> SEQUENCE: 8

Val Gly Val Ala Pro Gly
1               5

<210> SEQ ID NO 9
<211> LENGTH: 4
<212> TYPE: PRT
<213> ORGANISM: artificial sequence
<220> FEATURE:
<223> OTHER INFORMATION: synthetic peptide

<400> SEQUENCE: 9

Arg Ser Arg Lys
1

<210> SEQ ID NO 10
<211> LENGTH: 4
<212> TYPE: PRT
<213> ORGANISM: Artificial sequence
<220> FEATURE:
<223> OTHER INFORMATION: Synthetic peptide

<400> SEQUENCE: 10

Lys Thr Ala Lys
1

<210> SEQ ID NO 11
<211> LENGTH: 4
<212> TYPE: PRT
<213> ORGANISM: Artificial sequence
<220> FEATURE:
```

```
<223> OTHER INFORMATION: Synthetic peptide

<400> SEQUENCE: 11

Lys Ala Tyr Lys
1

<210> SEQ ID NO 12
<211> LENGTH: 4
<212> TYPE: PRT
<213> ORGANISM: Artificial sequence
<220> FEATURE:
<223> OTHER INFORMATION: Synthetic peptide

<400> SEQUENCE: 12

Lys Phe Tyr Lys
1

<210> SEQ ID NO 13
<211> LENGTH: 6
<212> TYPE: PRT
<213> ORGANISM: artificial sequence
<220> FEATURE:
<223> OTHER INFORMATION: synthetic peptide

<400> SEQUENCE: 13

Gly Lys Thr Thr Lys Ser
1               5

<210> SEQ ID NO 14
<211> LENGTH: 4
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Elaidoyl chain on the N terminal
      end

<400> SEQUENCE: 14

Lys Thr Phe Lys
1

<210> SEQ ID NO 15
<211> LENGTH: 4
<212> TYPE: PRT
<213> ORGANISM: Artificial sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: amidation by a Elaidoyl chain on the N terminal
      end

<400> SEQUENCE: 15

Lys Thr Ala Lys
1

<210> SEQ ID NO 16
<211> LENGTH: 4
<212> TYPE: PRT
<213> ORGANISM: Artificial sequence
<220> FEATURE:
<223> OTHER INFORMATION: Synthetic peptide
<220> FEATURE:
<221> NAME/KEY: MOD_RES
<222> LOCATION: (1)..(1)
```

```
<223> OTHER INFORMATION: amidation by a Elaidoyl chain on the N terminal
      end

<400> SEQUENCE: 16

Lys Ala Tyr Lys
1

<210> SEQ ID NO 17
<211> LENGTH: 4
<212> TYPE: PRT
<213> ORGANISM: Artificial sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: amidation by a Elaidoyl chain on the N terminal
      end

<400> SEQUENCE: 17

Lys Phe Tyr Lys
1

<210> SEQ ID NO 18
<211> LENGTH: 5
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end
<220> FEATURE:
<221> NAME/KEY: MISC_FEATURE
<222> LOCATION: (5)..(5)
<223> OTHER INFORMATION: Xaa being either a Proline P or a Leucine L.

<400> SEQUENCE: 18

Tyr Gly Gly Phe Xaa
1               5

<210> SEQ ID NO 19
<211> LENGTH: 6
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end

<400> SEQUENCE: 19

Gly Lys Thr Thr Lys Ser
1               5

<210> SEQ ID NO 20
<211> LENGTH: 6
<212> TYPE: PRT
<213> ORGANISM: Artificial sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: amidation by a Palmitoyl chain on the N
      terminal end
<220> FEATURE:
```

```
<221> NAME/KEY: MISC_FEATURE
<222> LOCATION: (6)..(6)
<223> OTHER INFORMATION: Xaa being Trp, Phe, Tyr, Tic, 7-hydroxy-Tic or
      Tpi

<400> SEQUENCE: 20

His Leu Asp Ile Ile Xaa
1               5

<210> SEQ ID NO 21
<211> LENGTH: 6
<212> TYPE: PRT
<213> ORGANISM: artificial sequence
<220> FEATURE:
<223> OTHER INFORMATION: synthetic peptide
<220> FEATURE:
<221> NAME/KEY: MOD_RES
<222> LOCATION: (1)..(1)
<223> OTHER INFORMATION: Acetylation on the N-terminal end

<400> SEQUENCE: 21

Glu Glu Met Gln Arg Arg
1               5

<210> SEQ ID NO 22
<211> LENGTH: 5
<212> TYPE: PRT
<213> ORGANISM: artificial sequence
<220> FEATURE:
<223> OTHER INFORMATION: synthetic peptide

<400> SEQUENCE: 22

Tyr Ala Gly Phe Leu
1               5

<210> SEQ ID NO 23
<211> LENGTH: 4
<212> TYPE: PRT
<213> ORGANISM: artificial sequence
<220> FEATURE:
<223> OTHER INFORMATION: synthetic peptide

<400> SEQUENCE: 23

Ala His Ser His
1

<210> SEQ ID NO 24
<211> LENGTH: 6
<212> TYPE: PRT
<213> ORGANISM: artificial sequence
<220> FEATURE:
<223> OTHER INFORMATION: synthetic peptide

<400> SEQUENCE: 24

Ser Ile Lys Val Ala Val
1               5

<210> SEQ ID NO 25
<211> LENGTH: 6
<212> TYPE: PRT
<213> ORGANISM: artificial sequence
<220> FEATURE:
<223> OTHER INFORMATION: synthetic peptide

<400> SEQUENCE: 25

Gly Pro Gln Gly Pro Gln
1               5
```